United States Patent
Breuer et al.

(10) Patent No.: US 8,109,469 B2
(45) Date of Patent: Feb. 7, 2012

(54) COMBINED STAIRCASE AND LAVATORY MODULE FOR AN AIRCRAFT

(75) Inventors: Matthias Breuer, Hamburg (DE); Felix Caspar Helfrich, Hamburg (DE)

(73) Assignee: Airbus Deutschland GmbH (DE)

( * ) Notice: Subject to any disclaimer, the term of this patent is extended or adjusted under 35 U.S.C. 154(b) by 1015 days.

(21) Appl. No.: 12/072,903

(22) Filed: Feb. 28, 2008

(65) Prior Publication Data

US 2009/0050738 A1    Feb. 26, 2009

Related U.S. Application Data

(60) Provisional application No. 60/904,088, filed on Feb. 28, 2007.

(30) Foreign Application Priority Data

Feb. 28, 2007    (DE) .................. 10 2007 009 863

(51) Int. Cl.
*B64D 11/00*    (2006.01)
(52) U.S. Cl. ..................................................... 244/118.5
(58) Field of Classification Search ............... 244/118.5, 244/118.6, 129.6; 182/97; 105/314–319
See application file for complete search history.

(56) References Cited

U.S. PATENT DOCUMENTS

| 177,795 | A | * | 5/1876 | Blochman ...................... 105/315 |
| 2,589,894 | A | * | 3/1952 | Ten Eyck ...................... 296/168 |
| 4,066,227 | A | * | 1/1978 | Buchsel ...................... 244/118.6 |
| 4,854,245 | A | * | 8/1989 | Platzer ...................... 105/317 |
| 6,464,169 | B1 | * | 10/2002 | Johnson et al. ............. 244/118.5 |
| 6,520,451 | B1 | * | 2/2003 | Moore ...................... 244/118.5 |
| 6,581,876 | B2 | | 6/2003 | Cheung |
| 6,659,225 | B2 | * | 12/2003 | Olliges et al. ................. 182/97 |
| 7,083,145 | B2 | * | 8/2006 | Mills ...................... 244/118.5 |
| 2007/0125909 | A1 | * | 6/2007 | Seiersen et al. ............ 244/118.5 |
| 2010/0140400 | A1 | * | 6/2010 | Helfrich et al. ............. 244/118.6 |

FOREIGN PATENT DOCUMENTS

| DE | 60207336 T | 6/2006 |
| EP | 901963 | 3/1999 |
| EP | 1279593 | 1/2003 |
| EP | 1293425 | 3/2003 |

* cited by examiner

*Primary Examiner* — Tien Dinh
(74) *Attorney, Agent, or Firm* — Lerner, David, Littenberg, Krumholz & Mentlik, LLP

(57) ABSTRACT

A module for an aircraft for accessing an upper region of the aircraft includes both an ascent region and an accommodation region, with the regions being divided from each other by a divider element. The accommodation region may, for example, be designed as an on-board lavatory. In this way it may be possible to do without the provision of an additional lavatory monument.

15 Claims, 6 Drawing Sheets

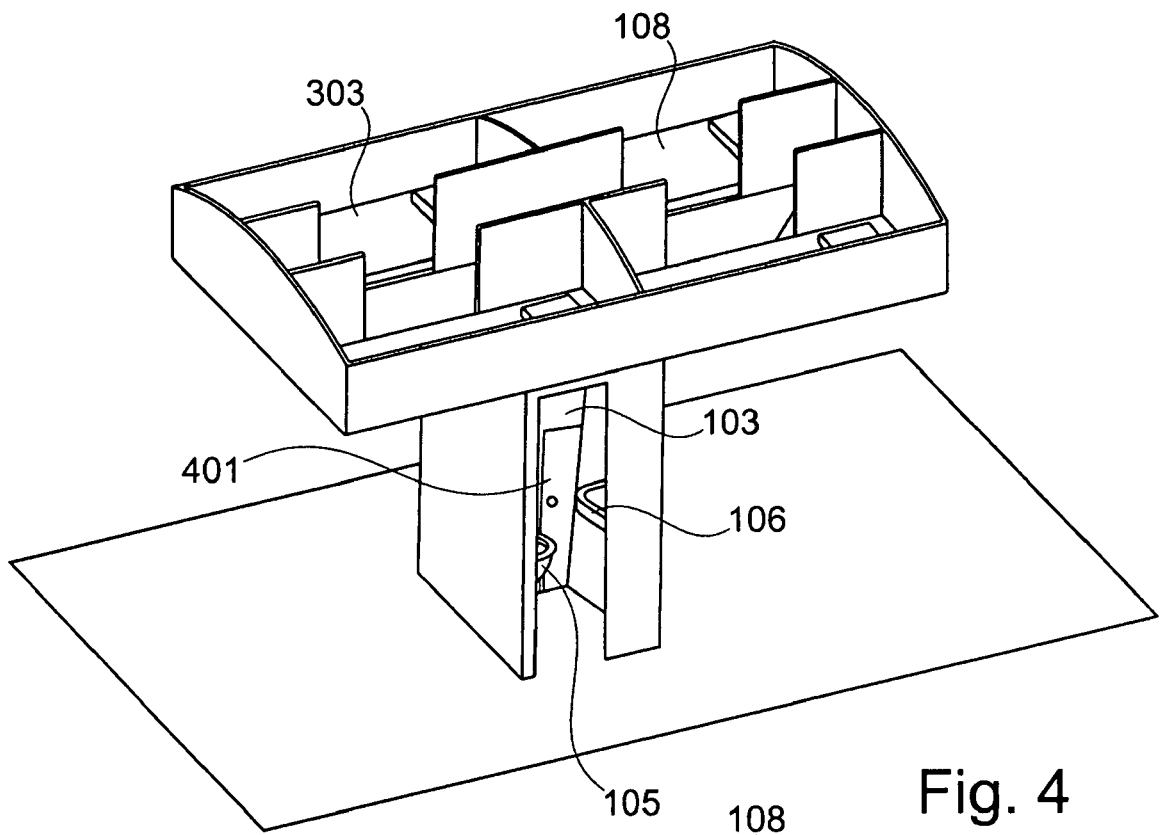
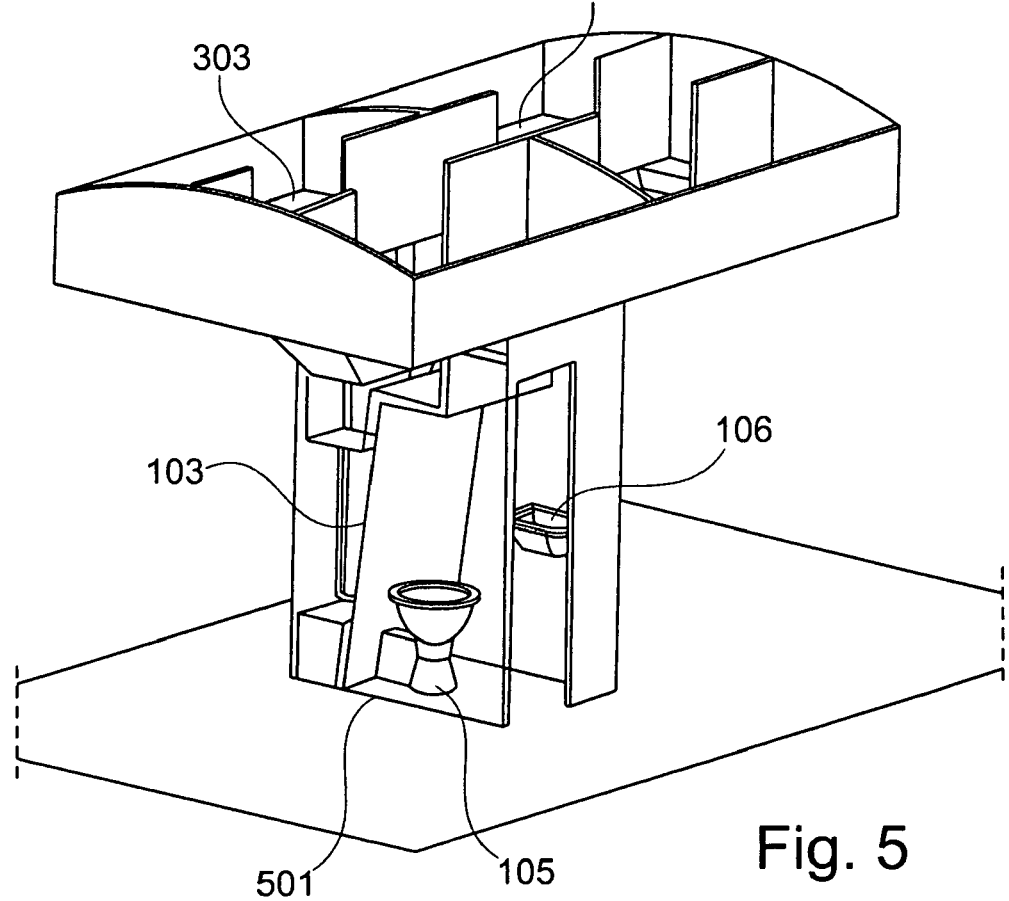

COMBINED STAIRCASE AND LAVATORY MODULE FOR AN AIRCRAFT

CROSS-REFERENCE TO RELATED APPLICATIONS

If claiming benefit of Provisional Application, the following language must be used: This application claims the benefit of the filing date of U.S. Provisional Patent Application No. 60/904,088 filed Feb. 28, 2007, the disclosure of which is hereby incorporated herein by reference.

BACKGROUND OF THE INVENTION

The present invention relates to ascent modules for aircraft. In particular, the present invention relates to a module for an aircraft for accessing an upper region of the aircraft, to an aircraft comprising such a module, and to the use of such a module in an aircraft.

Present-day modules for accessing an upper region of the aircraft, so-called staircases or stairhouses, are used to get from the main deck to the accommodation module or crew rest compartment (CRC) that is situated above the ceiling. From EP 1 279 593 a staircase is known in which after its use the flight of stairs can be hinged in the direction of the wall. From EP 1 293 425 a staircase is known that comprises two individual flights of stairs that are connected to each other by way of a landing.

The area used on the main deck is exclusively useable for the installation of the staircase. At best, individual trolleys can be pushed underneath the flight of stairs or underneath part of the flight of stairs. However, known ascent modules overall take up a considerable amount of space.

SUMMARY OF THE INVENTION

According to an exemplary embodiment of the present invention, a module for an aircraft for accessing an upper region of the aircraft is stated, wherein the module comprises an ascent region to provide a climbing unit for ascending from a lower region of the aircraft to an upper region of the aircraft. Furthermore, the module comprises an accommodation region and a divider element for dividing the ascent region from the accommodation region, wherein the separation element comprises a first region whose distance from the floor of the module is such that sitting in the accommodation region underneath the first region is possible, and wherein the divider element comprises a second region whose distance from the floor of the module is larger than the distance underneath the first region so that standing in the accommodation region underneath the second region may be possible.

By combining the ascent region with the accommodation region in a single module it may be possible to save space in an efficient manner because it is no longer necessary to install two separate modules (one for climbing up, and the other for accommodating crew members). Instead, climbing up and accommodation take place in a single module, which comprises, for example, the base area of a conventional on-board lavatory module. By means of the divider element between the ascent region and the accommodation region, privacy in the accommodation region may be ensured, and the stability of the overall module can be improved.

For example, the distance between the first region and the floor of the module is less than 180 cm, for example even less than 150 cm or 130 cm, such that the use of a toilet seat in that region is possible but erect standing is not possible. Furthermore, for example, the distance between the second region and the floor of the module is greater than 180 cm such that erect standing is possible in that area.

According to a further exemplary embodiment of the present invention, the ascent region is designed as a staircase.

For example, the ascent region comprises a flight of stairs or a ladder.

According to a further exemplary embodiment of the present invention, the ascent region comprises a lower landing to provide standing height in the entrance region of the ascent region.

In this way it may be possible to meet the internal/external requirements for internal equipment in aircraft engineering and, in addition, user comfort can be enhanced once again.

According to a further exemplary embodiment of the present invention, the accommodation region comprises an on-board lavatory.

In this way it may be possible to do without an additional lavatory monument or lavatory module in the aircraft.

According to a further exemplary embodiment of the present invention, the accommodation region further comprises a wash basin so that said accommodation region can also be used as a wash room.

According to a further exemplary embodiment of the present invention, the on-board lavatory is arranged underneath the first region of the divider element, and the wash basin is arranged underneath the second region of the divider element.

According to a further exemplary embodiment of the present invention, the arrangement of the divider element, the on-board lavatory and the wash basin is such that it may be possible for a person to stand upright (erect) at the wash basin but not in the region of the on-board lavatory.

According to a further exemplary embodiment of the present invention, the accommodation region comprises a workplace.

For example, the workplace comprises a table and/or a chair. At this workplace a crew member can carry out corresponding work tasks, for example documenting certain events during a flight.

Moreover, if necessary, further equipment items (e.g. a work light or a fax machine), or a connection (e.g. power outlet) may be provided.

According to a further exemplary embodiment of the present invention, the table is designed as a folding table. In this way space can be saved in addition when the table is not in use. For example, the accommodation region may then be used for storing baggage or trolleys.

According to a further exemplary embodiment of the present invention, the module further comprises a rest region, above the ascent region, for accommodating crew members.

The rest region may be designed as a crew rest compartment and can be permanently connected to the ascent region of the module. In this way an overall module can be provided which in the lower region provides a workplace or a lavatory region. Separate from it, an ascent region is provided, which provides access to the crew rest compartment situated above it. The overall module may then be integrated as a single continuous component in the aircraft.

According to a further exemplary embodiment of the present invention, the rest region comprises at least one bed. It may also be possible to provide several beds on which crew members and/or passengers can rest or sleep.

According to a further exemplary embodiment of the present invention, the ascent region comprises an upper landing that is accessible from the flight of stairs or from the ladder.

According to a further exemplary embodiment of the present invention, the upper landing of the divider element provides standing height in the rest region.

For example, the upper landing of the ascent region is sufficiently removed from the ceiling of the crew rest compartment for the users to be able to stand upright in the crew rest compartment. In this way the crew comfort may be further enhanced.

According to a further exemplary embodiment of the present invention, the module further comprises a connecting door between the ascent region and the accommodation region. In this way the crew has access, within the module, from the ascent region to the on-board lavatory or to the lower work region. There is thus direct access to the lavatory from the crew rest compartment (by way of the ascent region).

Furthermore, according to a further exemplary embodiment of the present invention, the module can comprise two or several lavatories which in various arrangements can be combined in a somewhat larger staircase. In this way the existing area may be used efficiently.

The module may be arranged in the front region of the aircraft. However, it may also be arranged in the middle region or in the rear region of the passenger cabin in order to provide access to passengers or to crew members from there.

If the module is arranged in the front region of the aircraft, direct access from the cockpit may be made possible. In this way the pilot does not have to open the security door between the cockpit and the passenger cabin when she/he wishes to enter the module.

According to a further exemplary embodiment of the present invention, an aircraft comprising such a module is stated.

Furthermore, according to a further exemplary embodiment of the present invention, the use of such a module in an aircraft is stated.

Further exemplary embodiments and advantages of the invention are stated in the following description of the figures.

Below, exemplary embodiments of the present invention are described with reference to the figures.

BRIEF DESCRIPTION OF THE DRAWINGS

FIG. 4 shows a diagrammatic perspective view of a module according to a further exemplary embodiment of the present invention.

FIG. 5 shows a perspective view of a further module according to an exemplary embodiment of the present invention.

Figure 1:
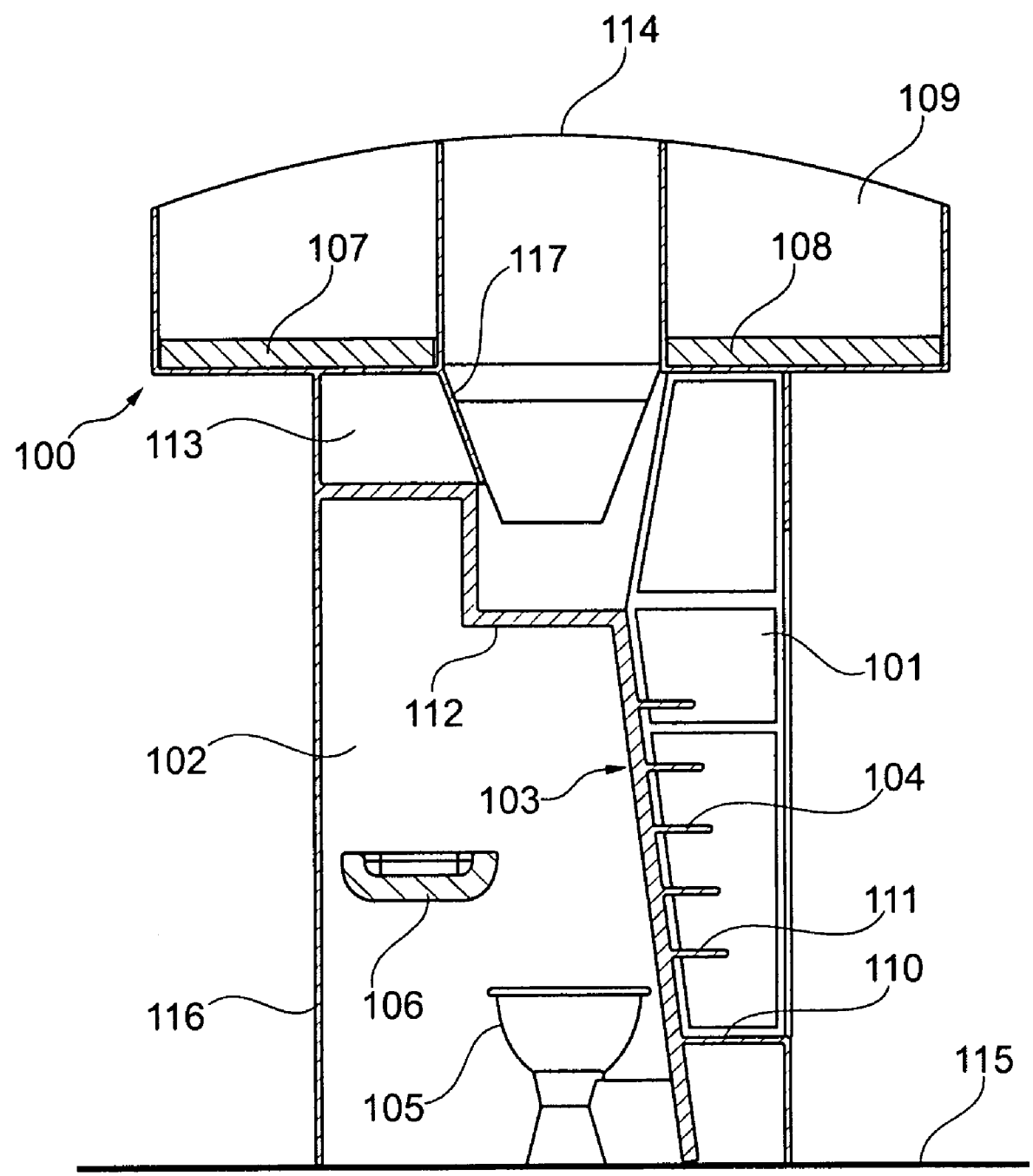
FIG. 1 shows a diagrammatic cross-sectional view of a module according to an exemplary embodiment of the present invention.

The illustrations in the figures are diagrammatic and not to scale.

In the following description of the figures the same reference characters are used for identical or similar elements.

DETAILED DESCRIPTION

FIG. 1 shows a cross-sectional view of a module 100 that essentially comprises an ascent region 101 to provide an ascent device from a lower region of the aircraft to an upper region of the aircraft, as well as a lavatory region 102.

The lavatory region 102 comprises an on-board lavatory 105 and a wash basin 106. The ascent region 101 comprises a flight of stairs 104 comprising several steps 111. As an alternative it is also possible to provide a ladder comprising corresponding rungs.

Furthermore, a landing 110 in the lower region of the flight of stairs 104 is provided, which landing 110 allows comfortable standing in the ascent region 101. In addition, an upper landing or floor 112 is provided, which, for example, may also make possible standing in an upright position or a slightly stooped position. In each case the upper landing 112 serves to enable comfortable access to the crew rest compartment.

The upper landing forms, for example, part of the divider element 103. The upper landing can, however, also be provided separately as an additional component that is placed onto the divider element or that is affixed completely independently of the divider element.

The lavatory space 102 and the ascent region 101 are separated from each other by way of the divider element 103. In this arrangement the divider element 103 carries out several functions. It ensures privacy for users of the lavatory. Furthermore, the divider element 103 results in enhanced stability of the overall module 100 and at the same time it can be used as the base element for the installation of the flight of stairs.

For example, the outside walls (for example wall 116) of the module as well as the landing 110 and the divider element 103 can be integrally interconnected. For example, these elements can be moulded in one piece.

As a result of the inclined design of the divider element 103 in the lower region, the distance between the divider element 103 and the floor of the module increases the further one moves away from the divider element 103. In the region of the on-board lavatory this distance is adequate to permit comfortable sitting. The upper landing 112 follows on from the incline, with said upper landing 112 leading to a further step below the storage space 113 so that in the region of the wash basin 106 there is adequate standing height.

In addition an accommodation module or crew rest compartment 109 is provided which is arranged above the ascent region 101. The crew rest compartment 109, too, can be integrally connected to the ascent region. In the crew rest compartment 109 several beds 107, 108 are arranged, in which crew members and/or passengers can sleep. The beds 107, 108 are accessible from the passage or floor 112. Furthermore, the module 100 can comprise a ceiling 114 which closes off the module towards the top.

In addition a storage space 113 is provided, which is located underneath the bed 107 and which can be used to store baggage or items of equipment. The storage space 113 can be delimited from the crew rest compartment 109 or from the ascent region 101 by way of a movable flap 117 or a fixed partition wall 117 that comprises an opening.

Furthermore, a floor region 115 can be provided, which is also integrally connected to the module. As an alternative, the module is installed without a floor region, directly onto the cabin floor.

By combining the staircase 101 with a lavatory 102 or a workplace, basically the area of a lavatory is gained and in this way the potential for further seats is created. With a clever arrangement it is not only possible to set up a comfortable passenger lavatory, but in addition also to create enhanced comfort within the crew rest compartment 109. By means of favourable architecture and arrangement of the individual elements, an agreeable standing height within the crew rest compartment 109 is created. Furthermore, the standing height in the entrance region of the staircase 101 is designed according to the internal/external requirements, so that comfort may be further enhanced.

However, it may also be possible to combine two or more lavatories in various arrangements in a somewhat larger staircase, and in this way the existing area can be used efficiently. Furthermore, integration of the lavatory in the staircase also makes it possible for the crew to use said lavatory. In this arrangement, apart from the solution illustrated in FIG. 1, the use of a further door may also be possible, which door allows direct access to the lavatory from the crew rest compartment (see for example FIG. 4). This lavatory can then be made accessible, either permanently or temporarily, exclusively to users of the crew rest compartment.

Figure 2:
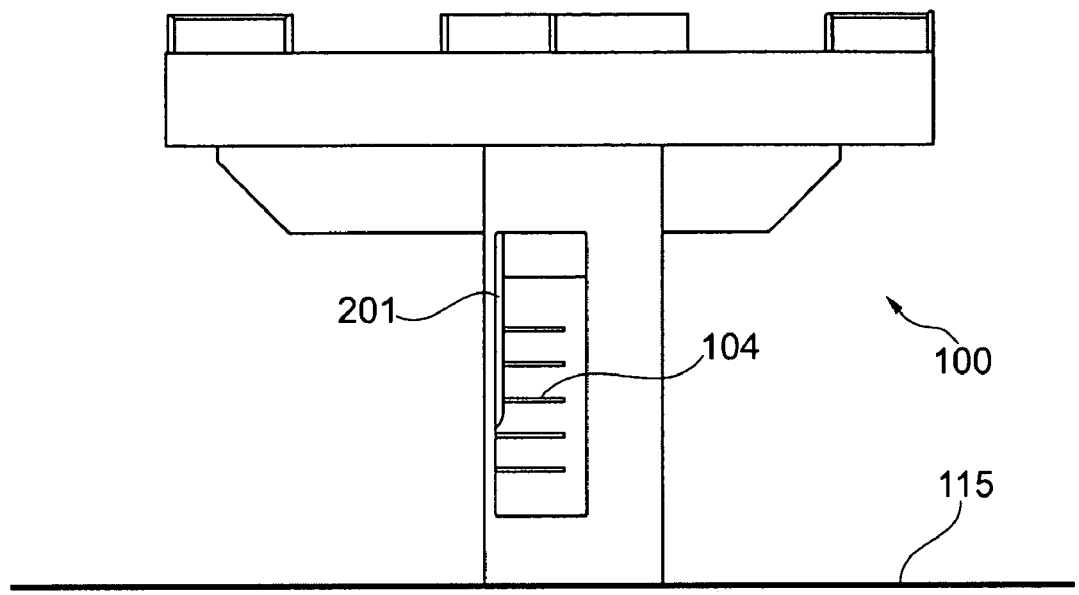
FIG. 2 shows a diagrammatic lateral view of a module according to an exemplary embodiment of the present invention.

FIG. 2 shows a lateral view of a module according to an exemplary embodiment of the present invention. In this arrangement the module 100, apart from comprising a flight of stairs 104, also comprises a stair railing 201, which is affixed to one side of the ascent region 101. Apart from the flight of stairs 104, for example a door to the lavatory can be in place.

Figure 3:
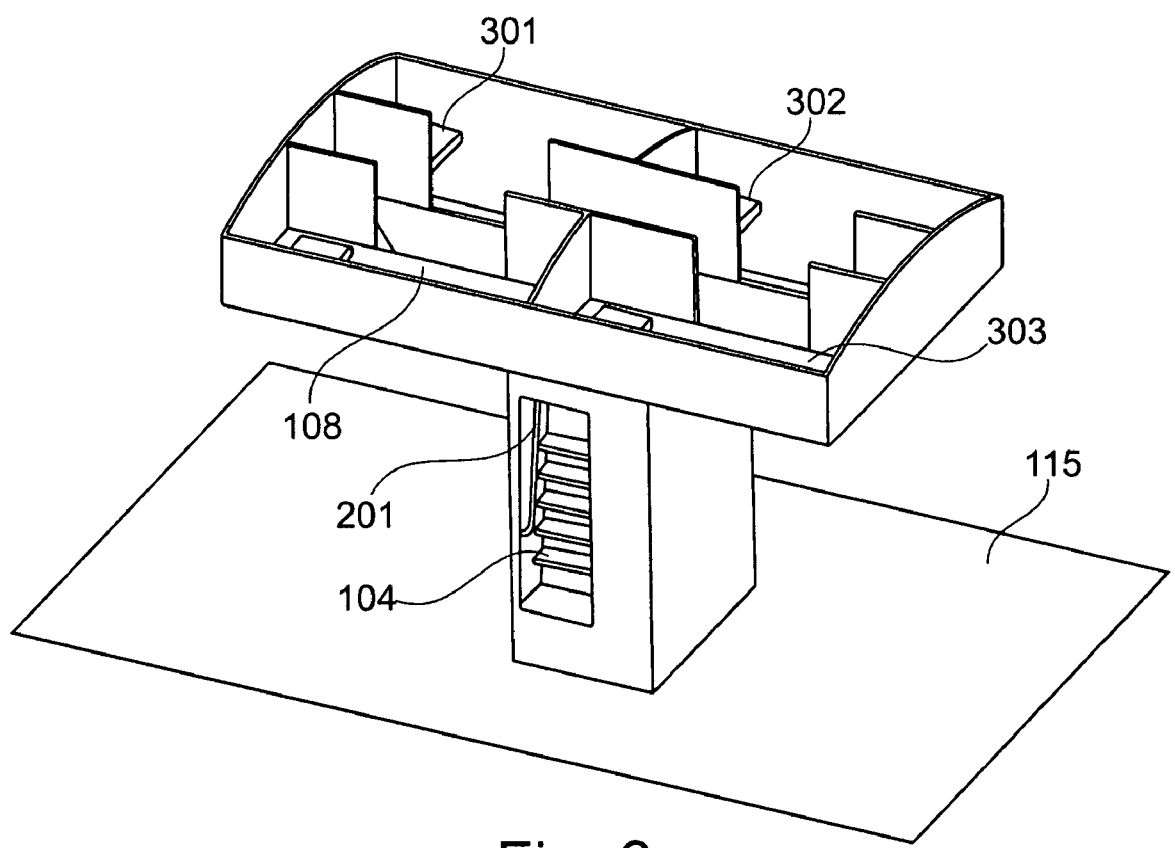
FIG. 3 shows a diagrammatic perspective view of a module according to an exemplary embodiment of the present invention.

FIG. 3 shows a perspective view of a module in which the crew rest compartment 109 comprises two beds 108, 303 as well as two tables 301, 302 as a work region.

It should be noted that all or individual beds may also be arranged in some other way, for example rotated by 90 degrees, in other words across the direction of flight.

FIG. 4 shows a perspective view of a further embodiment of the module in which a door 401 is arranged in the partition wall 103, which door is used as a passageway between the ascent region and the accommodation region/the lavatory. In this case the flight of stairs 104 (see FIG. 3) is not arranged over the entire width of the partition wall 103, so that the door is free.

FIG. 5 shows a further exemplary embodiment of a module according to the invention. For the sake of clarity the sidewall 501 is shown so as to be transparent in order to show the precise arrangement of the lavatory 105, the wash basin 106 and the partition wall 103.

Figure 6:
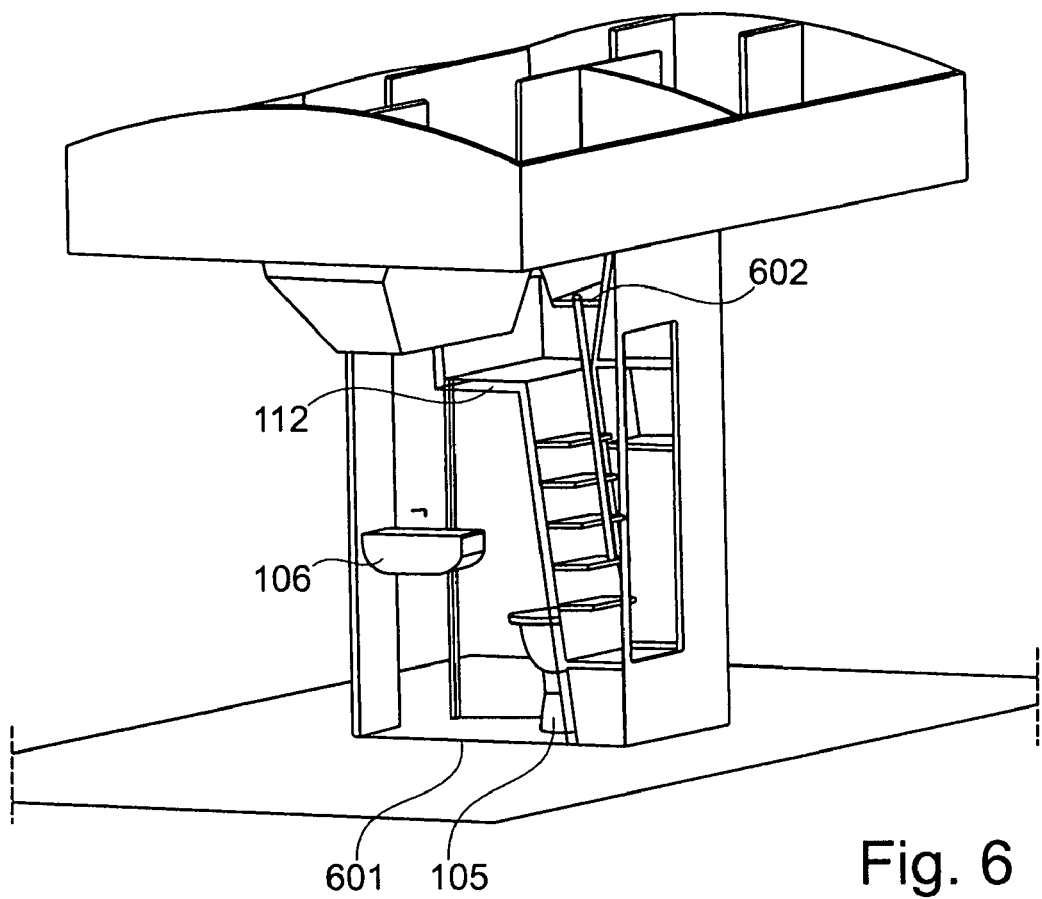
FIG. 6 shows a perspective view of the module shown in FIG. 5, viewed from a different side.

FIG. 6 shows a further view of a module according to the invention. Here again one of the sidewalls 601 is shown so as to be transparent so as to better show the arrangement of the individual elements. In particular, FIG. 6 shows that the upper landing 112 of the ascent region is arranged below the level of the passage floor 602. In this way the landing 112 may make it possible for persons to stand in the crew rest compartment.

Figure 7:
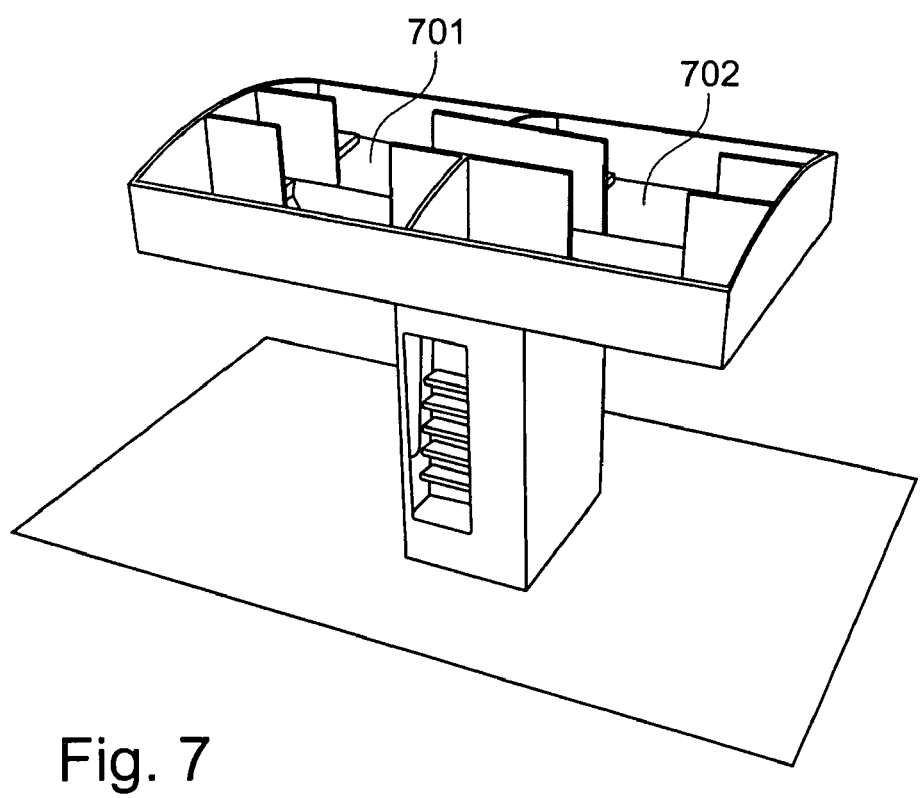
FIG. 7 shows a perspective view of a module according to a further exemplary embodiment of the present invention.

FIG. 7 shows a further exemplary embodiment of the module according to the invention, this time comprising two further beds 701, 702 instead of the work tables 301, 302 (see FIG. 3).

Figure 8:
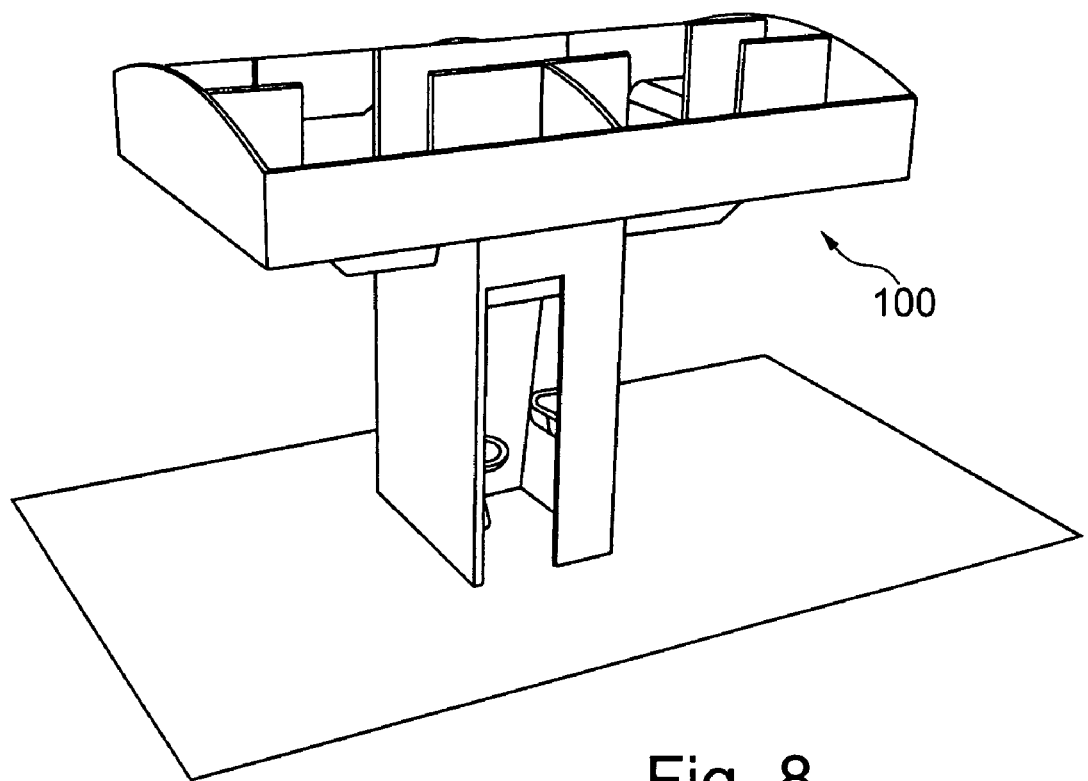
FIG. 8 shows a perspective view of a module according to a further exemplary embodiment of the present invention.

FIG. 8 shows a further exemplary embodiment of a module according to the invention.

Figure 9:
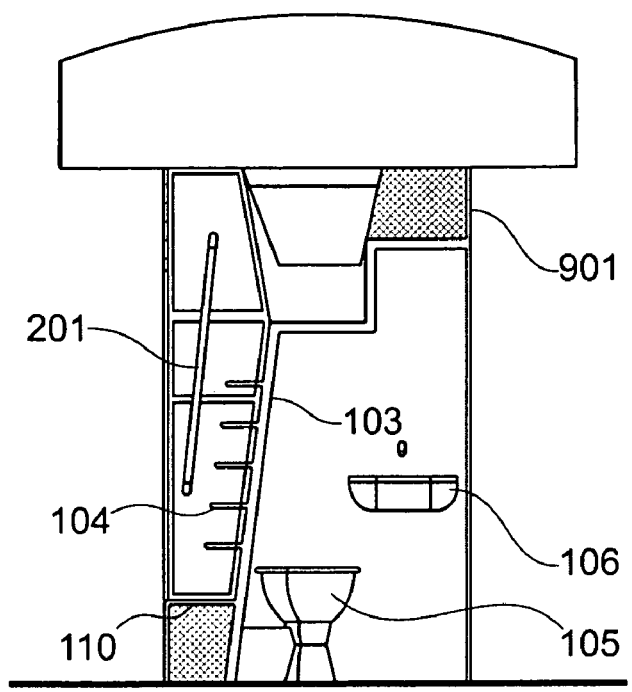
FIG. 9 shows a diagrammatic section view of a module according to a further exemplary embodiment of the present invention.

FIG. 9 shows a cross-sectional view of a module according to the invention, in which the arrangement of the stair railing 201, the flight of stairs 104, the wash basin 106 and the lavatory 105 as well as of the divider element 103 is shown. As shown in FIG. 9 the divider element 103 and the lower landing 110 are designed in one piece also forming part of the rear wall 901.

Figure 10:
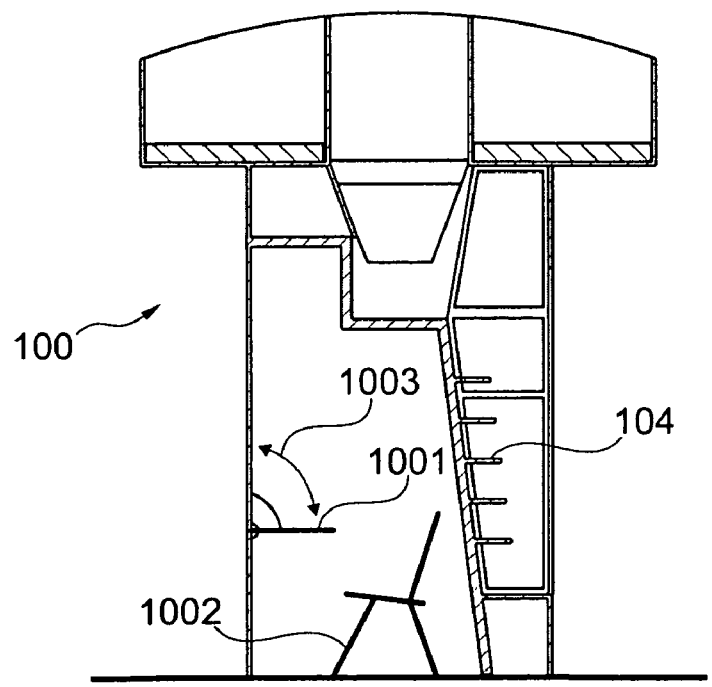
FIG. 10 shows a diagrammatic section view of a module according to a further exemplary embodiment of the present invention.

FIG. 10 shows a section view of a module according to a further exemplary embodiment of the present invention. Instead of comprising a lavatory and a wash basin, the module shown in FIG. 10 comprises a chair 1002 and a folding table 1001. As indicated by the arrow 1003, the folding table 1001 may be folded in or out. In the folded-in state the space created as a result thereof can be used elsewhere. It should be noted that the chair 1002 and the table 1001 may also be arranged at other positions in the accommodation region. For example, the positions of the chair and the table may be the other way round.

The module 100 need not comprise a connected crew rest compartment. Said module 100 may, for example, be connected as a retrofit component to already installed crew rest compartments, for example in that it replaces an existing on-board lavatory monument.

By means of the module described it may be possible to gain floor space on the main deck, which floor space would otherwise be taken up by a lavatory monument. Furthermore, the use of such a module provides the potential for installing further, additional, seats. Moreover, the module according to the invention may result in saving weight because some elements (e.g. walls) of lavatories and crew rest compartments are utilised in a shared capacity. The module can be implemented as a combination comprising a crew rest compartment and a lavatory (with a reduced requirement for space), as a result of which user comfort is enhanced. Since already existing lavatories that are positioned laterally on the frame elements or the exterior skin already have a similar geometric shape, they may be replaced by the module according to the invention.

Figure 11:
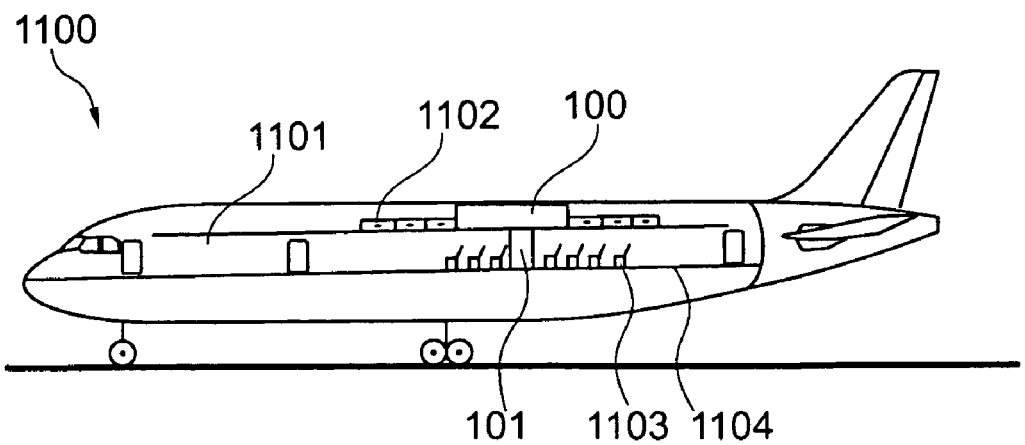
FIG. 11 shows a cross-sectional view of an aircraft comprising a module according to an exemplary embodiment of the present invention.

FIG. 11 shows a cross-sectional view of an aircraft 1100 comprising a module 100. In the passenger cabin 1101, seats 1103, stowage bins or hatracks 1102 and a crew rest compartment module (CRC module) 100 with a staircase 101 are arranged. Reference character 1104 shows the main deck level, from which the staircase 101 provides access to the interior of the module 100.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A module for an aircraft for accessing an upper region of the aircraft, the module comprising:
    an ascent region providing a climbing unit for ascending from a lower region of the aircraft to an upper region of the aircraft;
    an accommodation region comprising an on-board lavatory; and
    a divider element for dividing the ascent region from the accommodation region;

wherein the divider element comprises a first region at a first distance from a floor of the module that allows sitting in the accommodation region underneath the first region;

wherein the divider element comprises a second region at a second distance from the floor of the module larger than the first distance underneath the first region to allow standing in the accommodation region underneath the second region; and wherein the on-board lavatory is arranged underneath the first region of the divider element in the accommodation region.

2. The module of claim 1, wherein the ascent region comprises a staircase.

3. The module of claim 1, wherein the ascent region comprises a flight of stairs or a ladder.

4. The module of claim 1, wherein the ascent region comprises a lower landing to provide standing height in an entrance region of the ascent region.

5. The module of claim 1, wherein the accommodation region comprises a wash basin.

6. The module of claim 1, wherein a wash basin is arranged underneath the second region of the divider element.

7. The module of claim 1, wherein the accommodation region comprises a workplace.

8. The module of claim 7, wherein the workplace comprises a table and a chair.

9. The module of claim 8, wherein the table comprised a folding table.

10. The module of claim 1, further comprising:
a rest region above the ascent region for accommodating crew members.

11. The module of claim 10, wherein the rest region comprises at least one bed.

12. The module of claim 1, wherein the divider element comprises an upper landing that is accessible from a flight of stairs or from a ladder of the ascent region, which landing provides access to a rest region.

13. The module of claim 12, wherein the upper landing of the divider element provides standing height in the rest region.

14. The module of claim 1, further comprising a connecting door between the ascent region and the accommodation region.

15. An aircraft comprising a module for an aircraft for accessing an upper region of the aircraft, the module comprising:
an ascent region providing a climbing unit for ascending from a lower region of the aircraft to an upper region of the aircraft;
an accommodation region comprising an on-board lavatory; and
a divider element for dividing the ascent region from the accommodation region;
wherein the divider element comprises a first region at a first distance from a floor of the module that allows sitting in the accommodation region underneath the first region;
wherein the divider element comprises a second region at a second distance from the floor of the module larger than the first distance underneath the first region to allow standing in the accommodation region underneath the second region; and
wherein the on-board lavatory is arranged underneath the first region of the divider element in the accommodation region.

* * * * *